April 18, 1939. T. L. HARTMAN 2,154,677
PROCESS AND APPARATUS FOR CONDITIONING AND DISPENSING BEVERAGES
Filed Jan. 2, 1936
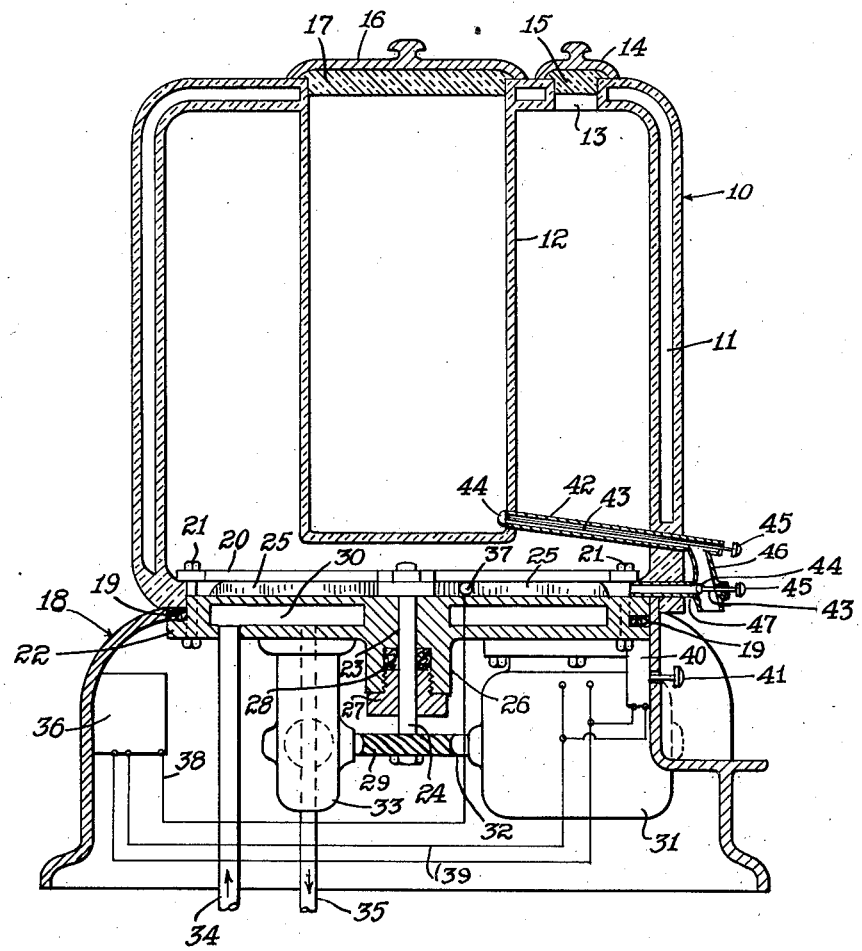
INVENTOR
Thomas L. Hartman
By Green & McCallister
His Attorneys Patented Apr. 18, 1939

2,154,677

UNITED STATES PATENT OFFICE 2,154,677

PROCESS AND APPARATUS FOR CONDITIONING AND DISPENSING BEVERAGES

Thomas L. Hartman, Pittsburgh, Pa., assignor, by direct and mesne assignments, of one-third to Harold M. Young, one-third to E. J. W. Keagy, both of Pittsburgh, Pa., and one-third to Reymer & Brothers, Inc., Pittsburgh, Pa., a corporation of Pennsylvania Application January 2, 1936, Serial No. 57,123

13 Claims. (Cl. 225—21)

My present invention relates to the conditioning and dispensing of beverages and more particularly to a process for automatically conditioning a plurality of beverages in a single machine and an apparatus from which such beverages may be dispensed jointly or severally.

In my copending applications, Serial Nos. 11,603, filed March 18, 1935, and 742,507, filed Sept. 8, 1934, I have set forth in some detail the various desiderata governing the conditioning and dispensing of a beverage composed of a liquid portion and a semi-solid frozen portion, the two portions being dispensed as a single beverage in predetermined proportions. I have found in some instances, however, that the public demand for a cooling beverage makes it advisable to condition the two beverage portions, that is, the liquid portion and the semi-solid portion, separately and to make provision for dispensing these two portions either separately or intermixed, thereby in effect providing three beverages, viz., a chilled liquid beverage, a semi-solid beverage of sherbet-like consistency and a beverage consisting of the two intermixed in suitable proportions. Such demand on the part of the public has not heretofore been successfully met with the result that the public had perforce to accept liquid beverages containing large, hard ice crystals, the disadvantages and unsatisfactory nature of which have been outlined in my aforesaid copending applications.

It is, accordingly, one of the objects of my present invention to produce both a process and an apparatus whereby either a chilled liquid beverage or a semi-solid frozen beverage or both intermixed, can be supplied to meet the public demand in a very simple and economical manner.

Another object of my invention resides in a process and apparatus for producing one, two or three beverages in a single machine.

A further object of my invention resides in an apparatus so constructed and arranged that it will produce either a chilled liquid beverage, a semi-solid frozen beverage of sherbet-like consistency and a mixture of the two in suitable proportions without duplication of parts and without resorting to expensive or complicated equipment and procedure.

A still further object of my invention resides in the production of mixed drinks of various kinds, which may include alcoholic ingredients, wherein one portion is in semi-solid frozen condition.

Other and further objects and advantages will be understood by those versed in this art or will be apparent or pointed out in the following description.

In the accompanying drawing:

The single figure illustrates, partly in vertical medial section and partly in elevation, an apparatus for producing three beverages in accordance with my present invention.

In general, my present invention resides in a method and apparatus for producing a semi-solid frozen beverage of sherbet-like consistency with the simultaneous production of a chilled liquid beverage of the same composition as the semi-solid frozen beverage and dispensing either beverage singly or both beverages intermixed in suitable proportions. The term semi-solid frozen beverage as used herein includes a beverage in semi-solid frozen condition, which, in its finished form, may be either a beverage or in the nature of a sherbet or water-ice with the understanding that it never contains hard solid crystals. That is to say, the material dispensed from container 10 as hereinafter set forth may be of such a nature as to classify it as a beverage or as a modified sherbet- or water-ice-like material.

Referring to the drawing:

The numeral 10 represents a suitable container or receptacle. This container 10 is preferably of double-walled construction with a dead air space or vacuum 11 between the two walls thereof, as shown. The container 10 is provided with a smaller container 12 depending centrally within the double-walled container. The double-walled container is provided with an aperture 13 for the admission of material to be conditioned in the double-walled container and this aperture is closed by a suitable closure or cap member 14 preferably provided with insulating material 15 for the usual purpose. The centrally depending container is likewise provided with a suitable closure or cap member 16 having insulating material 17 for the usual purpose.

The double-walled container 10 and the centrally depending container 12 are preferably made of vitreous china but may be made of material such as glass, or any other suitable material whether it be transparent, translucent or opaque. The use of a transparent material is desirable from the consumer's point of view because it adds to the attractiveness of the apparatus not only because the color of the beverage is visible but because the conditioning and dispensing of the beverage can be fairly well observed through the containers and thus the public is able to see just what it is getting.

The numeral 18 represents a suitable base member which may be given any desirable configuration such as that diagrammatically shown on the drawing. This base member may be made out of such materials as aluminum or stainless steel or other materials such as chromium plated metal which will be sanitary and attractive in its appearance. The bottom of the double-walled container and the top of the metal base are suitably secured together by means of any suitable clamp construction preferably with the interposition between the container and the base of packing material as indicated by the numeral 19. The details of this clamping arrangement are not essential and I have merely indicated more or less schematically a split flange or clamping ring 20 held in place by the bolts 21. At the same time this construction permits easy disassembly of the base and container either for shipping purposes or for any other necessary purpose such as for sterilization, cleaning, etc.

At the juncture of the container and base is provided a refrigerating element designated by the numeral 22. This element may be similar to that of my copending application Ser. No. 11,603 hereinabove referred to or it may be of a somewhat modified construction as herein shown. The element 22 may be composed of a metal casting as shown, the base side of which may be insulated with a non-metallic material having a relatively low rate of heat transfer so as to reduce the transfer of heat to the refrigerant and/or to the beverage being conditioned in the container. The main requirement is that the material must be one which is not attacked by the refrigerant or by the ingredients of the beverage and which will not contaminate the beverage or impart an undesirable taste thereto. I have found that stainless steel is successful for this purpose where element 22 is of metal, but, as above explained, I am not limited thereto. Whatever may be the precise material of which the element 22 is made, this element is provided with a central aperture 23 through which passes a short shaft 24. Attached to said shaft, just above the upper surface of the element 22, are a plurality of scraper-agitator elements designated by the numeral 25, the operation of which will be more fully apparent hereinafter. The element 22 is also provided with a central depending apertured boss 26 through which the shaft 24 also passes and in which it is rotatably secured by means of a stuffing box consisting of apertured plug or nut 27 and packing material 28, thus at the same time preventing the leakage of beverage into the base. The lower end of this shaft 24 is provided with a worm gear 29 of suitable size and construction. The element 22 is also provided with a relatively shallow chamber 30 which constitutes a refrigerating chamber. It is through this chamber that a refrigerant such as cold brine is circulated and which effects the rapid extraction of heat from the beverage in the container 10, thus converting it to semi-solid frozen form.

Suitably mounted and secured in the base is an electric motor designated by the numeral 31, which may be driven from any suitable source of current such as an ordinary electric lighting circuit. This motor is of suitably chosen size and horse-power and may be one rated between about one-sixth and one-half horse-power (⅙–½ H. P.). This motor has a shaft 32 projecting therefrom on which is provided a suitable pinion (not visible) for driving the worm gear 29 on shaft 24 and thus for rotating the scraper-agitator elements 25. The shaft 32 of motor 31 is also provided with a suitable pinion, gear or the like for driving the centrifugal brine pump 33 which is merely shown schematically. This pump creates a vacuum in chamber 30, thereby drawing brine up into the chamber through pipe 34 which is connected to a source of cold brine such as an ice-cream cabinet or the like. The brine passes through the pump and back to the cabinet for re-cooling via pipe 35. A rapid circulation of cold brine, e. g., at 5–10° F., is established through chamber 30, thereby rapidly reducing the temperature of the beverage in chamber 10 below 32° F., preferably to about 26° F., or less, depending on the composition being frozen.

Also mounted in the base 18 is a thermostatic device designated by the numeral 36, the temperature sensitive element 37 of which is located, as shown, adjacent the scraper-agitator elements 25 but in a position such as not to interfere with such elements. This thermostatic element is any device which, when the temperature of the beverage exceeds a predetermined maximum temperature, will cause the electric motor 31 to be started up automatically as will be better understood from the hereinafter stated sequence of operations. The thermostatic device 36 is electrically connected not only to thermostatic element 37 by conductor 38 but to electric motor 31 by conductors 39 in known manner. The electric lines 39 are likewise connected to a switch diagrammatically indicated at 40 which is adapted to be manually turned on by operation of switch button or control member 41 to start up motor 31.

As will be observed from the drawing, the centrally depending container 12 is provided, contiguous to its bottom, with a beverage delivery tube 42. This tube is suitably valved and as shown a rod 43 passes therethrough which has a tube closure element 44 on the container end thereof and an actuating handle 45 projecting exteriorly thereof. This discharge tube passes through the double-walled container 10 but at a point beyond the double walled construction thereof. Near the outer end thereof is a discharge tube 46 for delivering beverage from the centrally depending container to a suitable receptacle (not shown) which may be any suitable drinking receptacle or the like which is handed to the customer. It will be noted that a second valved delivery tube 47 extends from just within the container 10 to and merges with discharge tube 46. The delivery tube 47 is provided with a valved control of substantially the same construction as that already described in connection with delivery tube 42. Hence the same numerals have been used. The inlet end of tube 47 is open and communicates with the interior of the container 10, just above the refrigerating element 22.

The process which is involved and the operation of the present apparatus will be understood from the following:

A liquid beverage is placed in the double-walled container to a suitable level and another portion of the beverage is placed in the centrally depending container. The electric motor then automatically starts up because the beverage is relatively warm. Operation of the electric motor not only causes rotation of the scraper-agitator elements 25, but also causes circulation of cold brine through the chamber 30 at a relatively rapid rate. This rapid circulation of cold brine causes a rapid extraction of heat from the beverage in the double-walled container and at the same time, the scraper-agitator elements 25 scrape ice particles off the upper surface of the refrigerating element 22 and mix them with the beverage in the double-walled container to insure uniformity at all times. As heat is continued to be extracted from the beverage, it reaches a condition under thermostatic control—which only requires a matter of a short time—wherein it is substantially entirely converted into semi-solid frozen flakes. The thermostat is set at the proper temperature for the particular composition to be conditioned and thus the conditioning is stopped, as indicated, when a slushy condition is reached, which may roughly be said to be of sherbet-like or jelly-like consistency. The scraper-agitator elements are rotated in a typical installation at approximately 175 R. P. M. This provides enough centrifugal throw so that when tube 47 is opened, the semi-solid beverage is forced therethrough for discharge purposes. The lowering of the temperature of the beverage in the double-walled container also causes a chilling of the liquid beverage in the centrally depending container, but the temperature of this body of beverage never becomes sufficiently low to form frozen particles therein. Thermostatic element 37 is so constructed and arranged that when the semi-solid frozen beverage becomes raised even ½° F. in temperature due to the infiltration of heat, electric motor 31 is automatically started up through thermostatic device 36, it being understood that when the temperature of the semi-solid frozen beverage becomes sufficiently low the motor 31 stops and the beverage is then fully conditioned. The electric motor 31 can be started up at any time, e. g., when beverage is being dispensed, by the actuation of switch button 41 and, as will be understood from the foregoing, semi-solid beverage can only be dispensed when the scraper-agitator elements are in operation, because only then will the beverage be forced through tube 47.

It is thus apparent that by suitable operation of the valved discharge or delivery tubes, I can dispense in my present machine either the chilled liquid beverage in the centrally depending container or the semi-solid frozen beverage in the double-walled container as desired or called for, but that I can also dispense the two beverages intermixed by simultaneously opening both discharge valve devices, thus permitting the beverages to be discharged simultaneously through the common delivery orifice. I have thus provided an apparatus wherein in effect one, two, three or even more distinct beverages can be conditioned and dispensed, viz., a chilled liquid beverage, a beverage in semi-solid frozen condition and a mixture of the two, the proportions of which can be controlled by suitably correlating the sizes of the discharge tubes, the speed of the scraper-agitator elements, etc. The delivery tubes 42 and 47 are of sufficient internal diameter to prevent their becoming plugged or stopped up. Tube 42 is normally empty and does not cause beverage to be frozen therein so as to prevent delivery thereof.

The foregoing is intended to be illustrative and not limitative and I may make various changes, modifications, substitutions and omissions without departing from the spirit and scope or from the principles hereinabove outlined. It is apparent, moreover, that I may not only utilize beverages in the separate containers having the same composition, but that I may make use of beverages having different compositions. I am not limited in any respect to the particular kind or composition of beverage, but in general such will include fruit drinks such as citrus beverages, and vegetable drinks made from such materials as tomato juice or other vegetable juices. The method and apparatus is, however, likewise adapted for the production of such beverages as "Coca-Cola" and other beverages now sold as liquids chilled by the addition of ice crystals thereto as well as to mixed drinks of various kinds including alcoholic mixed drinks.

In connection with the latter, I place the alcoholic ingredient in the centrally depending container. This may be gin, whiskey, wines, brandies, cordials and the like. The non-alcoholic ingredients such as aqueous fruit, berry or vegetable mixtures with any desired or required flavoring syrups or ingredients commonly used in connection with alcoholic beverages are placed in the double-walled container.

Nor am I limited to a dispenser having the inner beverage container 12. That is to say, in some installations it will be desired or required to dispense only the semi-solid frozen beverage without admixture of anything else thereto and it is apparent that such can be accomplished without the container 12. Similarly, in those cases where I desire to dispense a more complicated beverage, i. e., one consisting of a number of different ingredients which require separate conditioning, I may provide the dispenser with more than one of the inner containers 12. In such cases, each container would be smaller than the container 12 shown and would be suitably disposed within the double-walled container 10. For example, if it is desired to dispense a beverage which contains three or more ingredients each requiring separate conditioning, then two or more inner containers 12 will be provided, each having a suitable discharge spout of stainless steel or the like such as the tube 42 indicated in connection with the container 12.

I am not limited to the pump construction and arrangement shown, in that this may be reversed to force refrigerant such as cold brine through chamber 30 under pressure. In this event, the construction and arrangement would be such that the operation of pump 33 will draw cold brine or other refrigerant from a suitable source and force it under pressure into the chamber 30. In such case, pipe 34 acts as an exit pipe for returning the brine to its source for re-cooling. I have found that the dispenser operates equally well either way.

In some cases the beverage or ingredients placed in one or more of the containers 12 may tend to stratify or to settle out to provide a non-uniform beverage or mixture. This is overcome by the fact that closure 16 fits so as to seal out atmospheric air. Closure 16 may be secured in place if preferred or required. Thus opening of tube 42 for dispensing purposes causes air bubbles to pass up through the beverage in container 12, automatically agitating and stirring it so as to ensure the dispensing of an average composition.

Having thus described my invention, what I claim as new and desire to secure by Letters Patent is:

1. An apparatus for conditioning and dispensing a plurality of beverages one of which is a semi-solid frozen beverage comprising a first container, a second container disposed in said first container, a refrigerating unit in heat exchange relationship with and forming the bottom of said first container, delivery ducts extending from each container and terminating in a common discharge spout, the said bottom of the first container being adapted to have the frozen beverage formed thereon, means to remove the frozen beverage therefrom and for discharging it into the delivery duct of the first container and controls of the common discharge spout for delivering beverage from said containers singly or intermixed.

2. An apparatus for conditioning and dispensing beverages comprising a first beverage container, a second beverage container disposed in said first beverage container, means for converting a body of beverage in said first container to semi-solid frozen form and a body of beverage in said second beverage container to a chilled condition, delivery means for each container having a common discharge spout, and controls for delivering either beverage alone or both beverages together from the common discharge spout, said first means including a refrigerating chamber in heat exchange relationship with the first beverage container and an agitator-scraper in the said first container adapted to deliver beverage to the delivery means of the first beverage container.

3. A method of conditioning and dispensing beverages comprising rapidly refrigerating a body of liquid beverage to convert it into semi-solid frozen particles, causing a separate body of liquid beverage to be chilled by the first body of beverage while maintaining the bodies in heat exchange relationship and while preventing reversion to original condition, and dispensing said beverages both singly or intermixed in their fully conditioned state.

4. An apparatus for conditioning and dispensing beverages comprising a first beverage container, a second beverage container disposed in said first container, a base on which said first container rests and to which it is secured, a refrigerating element at the juncture of the first container and the base, said refrigerating element being in heat exchange relationship with said first container and having a refrigerating chamber therein, a scraper-agitator unit in said first container and operatively associated with said refrigerating element, means for circulating a refrigerant through said chamber and for operating said scraper-agitator unit, a delivery tube extending from each container and terminating in a common discharge spout and means for selectively dispensing each beverage separately or both beverages intermixed.

5. A beverage conditioning and dispensing apparatus comprising a container, a refrigerating unit in heat exchange relationship with said container, means for converting a body of beverage in said container substantially entirely to semi-solid soft frozen flakes of a sherbet-like consistency and for maintaining said beverage in such condition and centrifugally acting means for dispensing said conditioned beverage, said last means assisting conditioning and ensuring delivery of a uniform serving of beverage.

6. A process for conditioning and dispensing a semi-solid frozen beverage comprising subjecting a body of liquid beverage to rapid refrigeration until it is substantially entirely converted to a semi-solid frozen condition of sherbet-like consistency, maintaining such beverage in such condition and delivering the same centrifugally for dispensing, the centrifugal movement aiding in the conditioning and ensuring the dispensing of a uniform serving of beverage.

7. A beverage conditioning and dispensing apparatus comprising means for conditioning a plurality of beverages of desired composition, one of which is in the form of semi-solid soft frozen flakes, means for maintaining each such beverage in prepared condition, and means for dispensing such prepared beverages singly or in combination, said last means including means for imparting a centrifugal throw to the semi-solid frozen flakes at the time when it is dispensed.

8. A process for conditioning and dispensing a plurality of beverages comprising converting a body of liquid beverage to the form of semi-solid soft frozen flakes, chilling one or more additional beverage bodies from the first body and dispensing the prepared beverages singly or in combination, the dispensing operation including the imparting of a centrifugal throw to the semi-solid frozen flakes at the time when they are dispensed and the centrifugal movement acting to aid conditioning and to ensure dispensing of a uniform serving.

9. An apparatus for conditioning and dispensing one or more beverages comprising a beverage reservoir in which a semi-solid frozen beverage is adapted to be formed, a refrigerating unit having a heat exchange surface forming a bottom for said reservoir, means for forming semi-solid frozen beverage particles upon the heat exchange surface, means for releasing said particles and mixing them with beverage in said reservoir, means for stopping the formation of further frozen beverage particles when the beverage is fully conditioned and means for centrifugally dispensing portions of conditioned beverage.

10. An apparatus for conditioning and dispensing one or more beverages comprising a beverage reservoir, a refrigerating unit having a freezing surface forming a bottom for said reservoir, scraper-agitator elements operable upon said freezing surface, means for withdrawing heat through said freezing surface, means for operating and controlling the scraper-agitator elements and means for withdrawing conditioned beverage from said reservoir adjacent the bottom thereof.

11. An apparatus for conditioning and dispensing one or more beverages comprising a beverage reservoir, a refrigerating unit having a freezing surface forming a bottom for said reservoir, scraper-agitator elements operable upon said freezing surface, means for withdrawing heat through said freezing surface, means for operating and controlling the scraper-agitator elements and means for withdrawing conditioned beverage from said reservoir adjacent the bottom thereof while the scraper-agitator elements are in operation.

12. An apparatus of the character described capable of producing up to three beverage compositions in a single unit comprising a first container wherein a semi-solid frozen beverage is adapted to be produced, means for producing such semi-solid frozen beverage from a body of unconditioned liquid beverage, a second container in heat exchange relationship with the beverage in the first container and adapted to form a chilled liquid beverage therein from said semi-solid frozen beverage and means for delivering portions of such conditioned beverages either singly or intermixed together with means for preventing undelivered beverage from becoming deconditioned.

13. A process of the character described comprising segregating a body of unconditioned liquid beverage, circulating a liquid refrigerant in heat exchange relationship with a limited surface of such beverage to form frozen particles, breaking up the frozen particles and disseminating them through the body of beverage, continuing to form frozen particles, to break them up and disseminate them until the body of beverage is converted to the form of soft frozen flakes, chilling a separate beverage body from the beverage body so conditioned and dispensing servings of such beverage bodies singly or intermixed, the act of dispensing serving to ensure uniformity of the beverage bodies and hence the dispensing of a uniform serving.

THOMAS L. HARTMAN.